United States Patent [19]

Micciche

[11] 3,892,050
[45] July 1, 1975

[54] DEVICE FOR TEACHING
[75] Inventor: Frank Micciche, Floral Park, N.Y.
[73] Assignee: Frank Micciche, Floral Park, N.Y.
[22] Filed: Mar. 21, 1974
[21] Appl. No.: 453,519

[52] U.S. Cl.......................... 35/8 R; 35/22 R; 35/30; 273/120 R
[51] Int. Cl. ............................................ G09b 1/02
[58] Field of Search ............ 35/8 R, 22 R, 30, 31 B, 35/31 R, 32; 273/118 R, 120 R, 121 R, 123 R, 124 R

[56] References Cited
UNITED STATES PATENTS

| 602,358 | 4/1898 | Perry | 273/123 R |
|---|---|---|---|
| 1,540,343 | 6/1925 | Kohler | 273/124 R |
| 1,877,190 | 9/1932 | McCormick | 273/124 R |
| 2,875,529 | 3/1959 | Cornelius | 35/32 |
| 3,006,082 | 10/1961 | Libbey | 35/30 |
| 3,253,358 | 5/1966 | Wright | 35/8 R |
| 3,805,415 | 4/1974 | Orfei | 35/22 R |

Primary Examiner—Wm. H. Grieb
Attorney, Agent, or Firm—Lewis H. Eslinger

[57] ABSTRACT

A teaching aid which enables exercise in the formulation and testing of hypotheses to improve indirect observation skills. It comprises a plurality of channels intersected by another channel, exclusive thereof, through which they communicate, and a shield for blocking the intersecting channel from view and includes projectiles, advantageously small steel balls, and test objects that are used with the aid. In use, a test object is placed in the intersecting channel and blocked from view by the shield. Projectiles are then guided in each respective channel of the plurality. By determining in which channels of the plurality the movement of a respective projectile is affected by the test object therein, a hypothesis can be formed as to its identity. The formulation of such a hypothesis helps to improve indirect observation skills.

12 Claims, 5 Drawing Figures

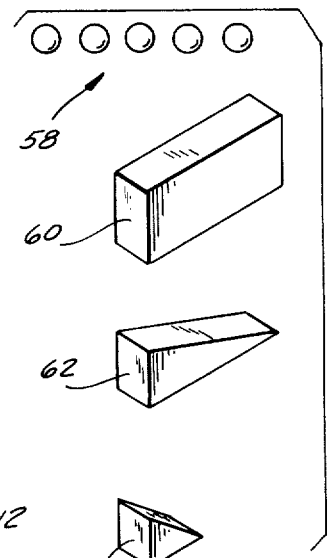
FIG. 1
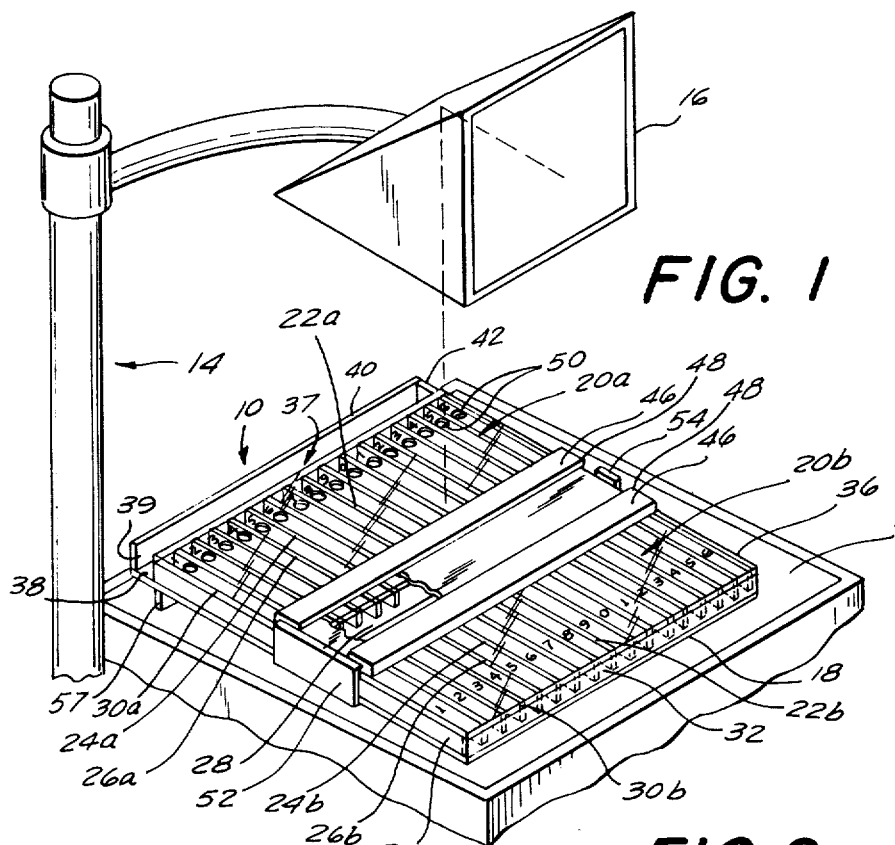
FIG. 2
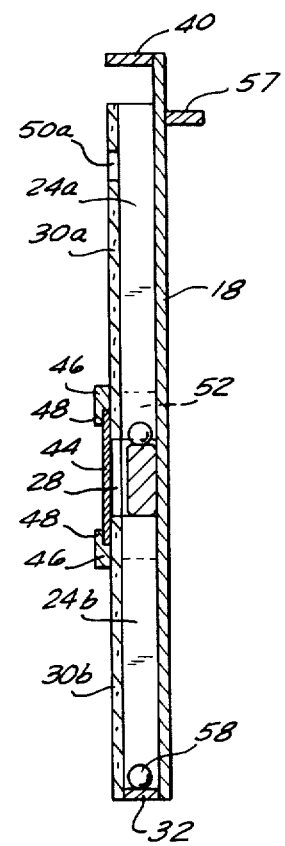
FIG. 3
FIG. 4

3,892,050

DEVICE FOR TEACHING

This invention relates to teaching aids and more particularly relates to such aids which develop skills in indirect observation.

A major objective of modern education, especially science education, is to improve indirect observation skills. Many devices and methods have been employed in an attempt to improve such skills. Probably the best known, and most widely used, is the "black box" method wherein an object to be investigated is placed within a box which shields it from view. Provision is made for subjecting the object therein to one or more tests and for observing the results of these tests, thereby to investigate its characteristics while it remains in the box. When the tests are complete, the object within the box is fully, or at least partially, identified from an interpretation of the test results.

To improve indirect observation skills, an opportunity must be provided to hypothesize about that which cannot be directly observed. Although the usual black box method may possibly be useful for illustrating how an object can be investigated indirectly, it has limitations as an educational aid to improve indirect observation skills because the nature of the tests commonly performed upon the object, or objects, within the box tend to be too complex, offering no, or at best little, opportunity to hypothesize about the object therein.

The mode of operation of the test upon the object, and/or the probable identity of the object, must be known beforehand, i.e., before the test is performed. Then, if a certain test result appears, it follows rotely that a certain object is within the box. Only the skill of memory is possibly improved. Furthermore, if the specific nature of the test, i.e., its operation is not known beforehand, only arbitrary guesses can be made as to the nature of the object within the box. Accordingly, no meaningful opportunity to hypothesize is provided. Furthermore, once the box is opened, direct observation, not indirect observation becomes the mode of operation, and, hence, the skill improved.

Accordingly, an object of this invention is to provide a teaching or educational aid which enables exercise in the formulation and testing of hypotheses for improving indirect observation skills.

A further object of this invention is to provide such a teaching aid which can be used effectively in a group, e.g., a class situation.

Still a further object of this invention is to provide a teaching aid which accomplishes the above and other objects in a relatively simple, easy to use device.

These and other objects of the present invention are accomplished, in one preferred embodiment, by the provision of a teaching aid which enables one or more test objects, each of a simple shape, to be hidden from view in a channel, or target area, in the aid, and then to be subjected to a test, the operation of which is so simple that, without prior knowledge of its mode of operation or the probable identity of the test object a hypothesis can be formed as to its identity. This aid which advantageously has been given and is called by the tradename "Hypothesis Machine", comprises a flat plate having guide rails thereon for defining a plurality of channels and an intersecting channel, exclusive thereof, through which each channel of the plurality communicates with the others therein. A removable, opaque shield is mounted above the intersecting channel to block it from view. A test-object, which advantageously is a generally flat, straight-sided rectangularly-, or triangularly-, shaped object, whose thickness is about equal to the height of the guide rails, is provided for placement in the intersecting channel beneath the shield. The test-object, hidden from view by the shield, is indirectly observed by guiding a projectile, advantageously a small ball, through each channel of the plurality and by observing in which channels the movement of the projectile therethrough is affected by the test-object. A rectangularly-shaped test-object blocks, and then stops, the projectile in the channel through which it is being guided, while a triangularly-shaped test-object blocks and then guides the projectile through the intersecting channel to another channel. By observing the projectiles, a hypothesis can be formed as to the identity of the test-object. This hypothesis, is capable of being formed without prior knowledge of the mode of operation of the test, or of the test-object, because the test, i.e. whether or not a projectile is blocked, or blocked and guided, is simple. After the hypothesis is formed it may be proved, i.e. verified, by removing the shield to directly observe the test object. Furthermore, by making the plate upon which the guide-rails are placed of a transparent material, the teaching-aid advantageously can be used with an overhead projector for teaching a group, e.g. a group of students.

Other objects and advantages of the present invention will be made apparent in the following description and drawing.

IN THE DRAWINGS

FIG. 1 is a perspective view, partially cut away, of a teaching-aid constructed in accordance with the teachings of this invention and of an overhead projector upon which the aid is placed for use therewith;

FIG. 2 is a top-plan view, partially cut away, of the teaching-aid shown in FIG. 1;

FIG. 3 is a cross-sectional view taken along the line 3—3 of FIG. 2;

FIG. 4 is a perspective view of spherical projectiles and various test objects for use with the teaching aid shown in FIGS. 1 through 3.

Figure 5:
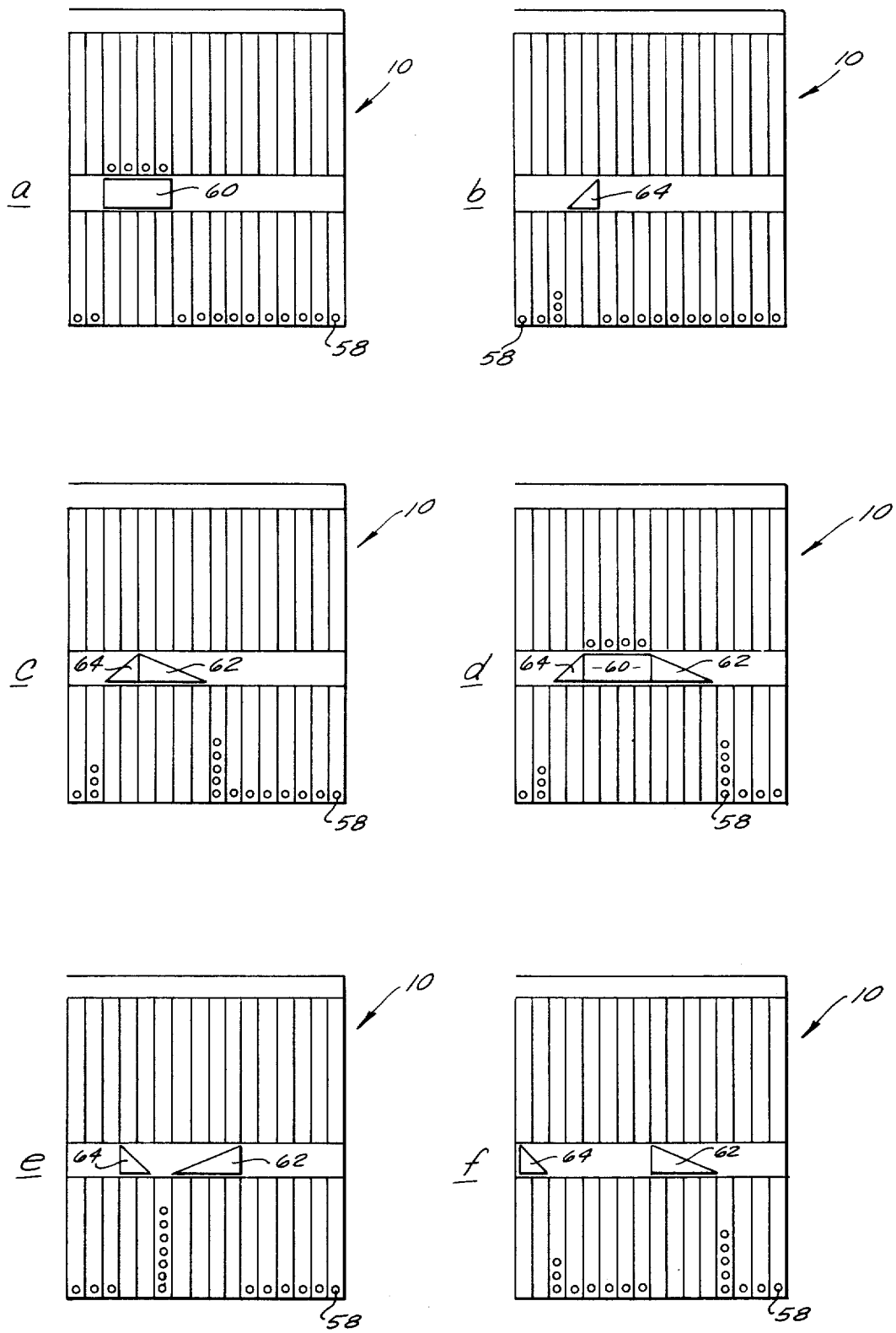
FIG. 5 is a schematic view of six teaching-aids, identical to the one shown in FIGS. 1 through 3, which illustrate six different arrangements of the test objects and projectiles, shown in FIG. 4, within the aid.

FIG. 1 shows a teaching aid 10, constructed in accordance with the teachings of this invention, positioned upon the platform, or stage, 12 of a standard overhead projector 14 having an overhead lens system 16 for projecting a visual image of the opaque parts of the teaching aid so that those parts can be viewed by a group, for example, a group of students in a classroom.

With reference now to FIGS. 2 and 3 as well, this teaching aid 10 comprises a generally flat-surfaced base 18 having two spaced-apart series of elongated guide-rails 20a and 20b affixed to the base 18 in a suitable manner, such as by gluing them thereon. Each guide-rail in each series projects perpendicularly, upwardly from the base 18, and is spaced apart from, and has its longitudinal axis aligned with respect to the longitudinal axis of, a corresponding guide-rail in the other series. Accordingly, corresponding guide-rail pairs are formed, guide-rails 22a and 22b being illustrative. Each of the corresponding guide-rails 34 and 36 which are continuous and located at the extreme sides of the series of guide rails, together form an elongated guide-rail having a missing section along its length. For example, the elongated guide-rail formed by guide-rails 22a, and 22b has a missing section between points c and d thereon. All of these elongated guide-rails, including the continuous guide-rails 34 and 36, are in parallel alignment and spaced apart slightly from each other. Thus a series of channels, extending substantially the full length of base 18, are defined between adjacent ones of these elongated guide-rails. In this embodiment 16 such channels are formed. Further, the missing sections of all these elongated guide-rails are aligned with respect to each other for defining an intersecting channel 28. This channel 28 perpendicularly traverses the series of channels at the midsection of each respective one therein and provides for communication between all of them.

The channels numbered 1 through 9 and 0 through 6 are terminated at the lower end of teaching aid 10 by a stop 32 which projects perpendicularly, upwardly from base 18 at its end edge, and which rests flushly against the end edges of such guide-rail in series 20b, with the exception, in this illustrative embodiment, of the respective rails 34 and 36 located at the extreme sides of the series of guide-rails. These rails 34 and 36 are slightly longer than the others, and stop member 32 fits between them with its respective end edges resting flushly against the end edges of their respective sides.

At the top of the aid, i.e. at the end opposite the bottom defined by stop 32, the channels are open, each terminating, i.e. flowing into, a trough-like receptacle 37 having one open end 39, a bottom 38, and side walls 40 and 42 which project upwardly from the bottom 38, respectively at its end edge and along one of its sides. The wall 42 advantageously is an extension of guide-rail 36, and the bottom 38 advantageously is an extension of base 18. This receptacle 37 and the stop 32, described above, are affixed to the base 18 in a suitable manner, such as by gluing them thereon.

The teaching aid 10 has a top comprising two sections 30a and 30b, each of which is a flat plate mounted above a respective one of the two series of guide-rails 20a and 20b by affixing it, for example by gluing it, to the top edges of the respective guide-rails therein. Each plate 30a and 30b extends, respectively, from the top to the bottom of the rails of its respective series 20a and 20b and completely across them, covering all of the channel portions defined therebeneath, but leaving intersecting channel 28 uncovered. Furthermore, the section 30a at the top of aid 10 has a series of circular cutouts 50 therein, one cutout above each channel, e.g. 50a above channel 5, so that a spherical projectile can be introduced into each of the channels for guidance therethrough.

Also, each section 30a and 30b has the hereinbefore mentioned series of numbers 1 through 9 and 0 through 6 thereon. These numbers are made of thin plastic and are glued to the sections and comprise a permanent part of the teaching aid. Corresponding numbers, one on each section 30a and 30b, are mounted above a respective one of the channels 20a, 20b to identify it. They are opaque so that they can be projected by an overhead projector, as will be described in detail below.

It should be noted that, with the exception of the series of numbers on the sections 30a and 30b, all of the elements heretofore described comprising this teaching-aid are made of transparent plastic, approximately one-eighth inch thick, whereby, when the aid is used with an overhead projector, light will pass through these parts allowing the opaque parts and contents of the aid to be projected for viewing by a group. However, it should be noted that only portions of the base to each side of the intersecting channel, and corresponding portions thereabove in the respective top sections, need be transparent for the effective use of this teaching aid with an overhead projector. The reason for this is that the channels need be observable only at one point to each side of the intersecting channel 28 for its effective use as will be apparent from the description at the end of this specification pertaining thereto.

Again with reference to FIGS. 1 through 4, a flat, rectangularly-shaped, opaque shield 44 for blocking intersecting channel 28 from view, when it is looked down upon from above, and which, accordingly, causes the intersecting channel 28 to project as a dark area when the aid is used with an overhead projector, is equal in length to, but is slightly wider than, intersecting channel 28. It is held by L-shaped brackets 46 to slide above channel 28, along the top edges, adjacent the intersecting channel 28, of the top sections 30a and 30b. The brackets 46 are mounted, one each, on the top of the respective top sections 30a and 30b. This opaque shield 44 fits snugly within these brackets 46, beneath the arms 48 thereof, and can be slid completely out from beneath them for removal from the teaching aid 10 so that the intersecting channel can be viewed from above, or its contents projected when it is used with an overhead projector.

Furthermore, stop 52, mounted adjacent the guide-rail 36 by gluing it thereto, has its top positioned in the path of motion of shield 44 to arrest its motion and to align it in proper position, when it is slid, from right to left (as viewed in the drawing) within the brackets 46, into position above the intersecting channel 28. A locking lug 54, mounted to pivot on a pin 56 which passes through it and through guide rail 36, is provided to lock shield 44 in position when it is properly aligned above intersecting channel 28. When it is in the position shown in FIG. 2 wherein its longer side is horizontally disposed, the locking lug 54 allows shield 44 to pass thereabove, but when rotated about pin 56 ninety degrees from that position to the position shown in FIG. 1, wherein its longer side is vertically disposed, its uppermost edge blocks the movement of shield 44, locking it in position above 28.

Finally, a support-rail 57, also advantageously made of transparent plastic, is attached, at a position which is beneath the guide-rails 20a at the junction where they meet with the receptacle 39, to the base 18 to maintain the aid at a slight angle with respect to the horizontal when it is placed on a flat surface, such as the platform 12 of the overhead projector 14, whereby when, as will be explained in greater detail below, a spherical projectile is introduced into a channel through one of the circular cutouts 50, it will roll down, on the base 18, through the channel, towards the stop 32.

With reference now to FIG. 4 as well, the teaching-aid 10 uses a plurality of spherical projectiles, in this illustrative embodiment sixteen, one for each channel, each adapted to fit through a cutout 50, into a respective one of the channels of the plurality. It also uses test objects 60, 62, and 64, each adapted to fit within the intersecting channel 28. These spherical projectiles advantageously are steel balls. The test objects advantageously are generally flat and have straight sides, and are respectively, either rectangularly, or triangularly, shaped. The thickness of each is about equal to the height of the guide-rails, and each is narrow enough in height to fit within the intersecting channel 28 and long enough in width, to span and to block at least one channel of the plurality when it is placed in the intersecting channel.

The specific test objects 62 and 64 are triangularly shaped. The width of object 62 is such that it blocks four channels of the plurality when it is placed in the aid. The test object 64 is somewhat shorter in width, being only long enough to block two channels, when placed in the aid horizontally, and only one channel when placed vertically therein, i.e. with its longer side aligned in the direction of the rails. The test object 60 is rectangular in shape, wide enough to block four channels, and is shown in FIGS. 3 and 4 placed in the intersecting channel 28 of the aid 10.

Although the teaching aid can be used by an individual, or by a small group gathered around it, it is used advantageously with an overhead projector, by an instructor before a group of students. When so used, the teaching aid, which hereinafter is referred to by its tradename —Hypothesis Machine— is shown to the students with the shield 44 covering the intersecting channel 28 and then is placed on the platform 12 of an overhead projector 14, whereupon it rests at a slight angle as shown in FIG. 1. Work sheets, comprising diagrams of the channels of the Hypothesis Machine, are distributed to the student for their use. The students then are instructed to take notice of the series of channels which are marked at each side of the opaque shield 44 with the opaque numbers 1 through 9 and 0 through 6 and which, along with the opaque shield, are projected for viewing. Then, one by one, balls 58 are dropped through the cutout 50 into each of the numbered channels. The students are instructed to observe, as the balls projected for viewing by the overhead projector 14 travel, seemingly unobstructed, to the end of each respective channel, whereat each is stopped by stop 32. The students then are asked to hypothesize about what is beneath the opaque shield, based on the observation of the balls as seen guided through the channels and on the observed arrangement of the balls at the bottom of the device.

After a brief discussion, the opaque plastic shield may be removed so that the students can observe that there is an empty space, i.e. the intersecting channel, beneath the shield, but, if desired, this step can be eliminated and the lesson can proceed without such a showing. Then the instructor removes the Hypothesis Machine from the projector platform and removes the balls from the machine by tipping the machine up so that the balls first roll back through the channels into receptacle 37, and then sideways so that they roll out through its open end 39. Then, without the students knowledge, or with a brief explanation of what is being done—but without divulging anything specific—, a test object, advantageously the rectangular block 60 which is simple, and thus best to start with, is placed in the intersecting channel, for example as shown in FIGS. 1 and 2, and covered by the shield 44.

The Hypothesis Machine is then returned to the projector platform 12 and the instructor asks the students to observe, once again, as the balls again are guided, one by one, through the channels. The students can record the results on their worksheets, if they have them. As shown in FIGS. 1 and 2, tubes numbered 3 through 6 do not have balls at their respective ends because the balls are blocked by the test object and are stopped and held thereby, beneath the shield 44. As in the previous exercise, the students are asked to consider the test and to study the resulting arrangement of balls, and to form an hypothesis. The students may wish to draw proposed shapes on their work sheets which they think will produce the observed results.

Discussion then takes place. Proposed objects may be cut from cardboard and tested in the Hypothesis Machine. After the discussion, the students may be allowed to directly observe the test object, or if preferred— without such direct observation-- the rectangular test object is removed by the instructor and another test object, e.g. the triangularly-shaped one 64, is placed in the Hypothesis Machine. This triangularly-shaped object 64 blocks and then guides the projectiles coming into contact therewith along its top sloping edge, through the intersecting channel, to other channels providing an arrangement of balls such as schematically shown in FIG. 5(b). The process then is repeated. After discussion, and possible after further testing of objects which are made by the students, the triangular test object, and the rectangular test objeft—if it has not already been shown—may be shown to the class, so that the students can test their hypothesis by direct observation. However, again, if desired, the step of showing the test object to the students can be bypassed.

The same process is then tried with more complicated shapes or with combinations of shapes, such, for example, as certain of those shown schematically in FIG. 5(c) through (f). By rotating and combining the shapes it is possible to product different results; a great many original and unique combinations are possible.

After the more difficult arrangement of test objects are demonstrated, if the various test objects and the intersecting channel have not already been demonstrated to the students, they then are allowed to observe the passage of the balls without the shield, and to directly observe the test objects and to observe a few, or all, of the various tests performed without the shield.

It should be understood, of course, that at what point the intersecting channel, and/or the test objects, are shown to the students, depends upon their level of sophistication, understanding and attention, all of which can be taken into consideration by the instructor.

On a more sophisticated level, the actual size and shape of the smaller triangular test object 64 (see FIG. 5 (b)) may be determined if the instructor rotates it after each completed test. The instructor, must of course, tell the students the angle of rotation, or the position of a particular face, for each trial.

Accordingly, it is seen that a teaching, or educational, aid which enables exercise in the formulation and testing of hypothesis has been provided for use in improving indirect observation skills. Furthermore, such a teaching aid is relatively easy to use and can be used with an overhead projector by an instructor before a group, for example, a group of students in a class.

It should be understood, of course, that this aid can be made of any suitable material suitably joined together by any method, and that, if other means are provided for enabling the projectiles to be viewed both before and after they pass through the intersecting channel, the aid need not be made of transparent material. Furthermore, many of the parts comprising this aid may be made integral with other parts. For example, excluding the movable parts, i.e. the shield 44 and the locking lug 54, this aid would be made as one integral unit. Also, other type shields, or shield arrangements, could be used.

It will be appreciated that the device of the present invention not only is useful as a teaching aid, but also can be provided as an educational toy for use by children, in learning basic geometric shapes.

The foregoing disclosure relates only to a preferred embodiment of the invention, and numerous modifications or alterations may be made without departing from the spirit and scope of the invention as set forth in the appended claims.

What is claimed is:

1. A teaching aid for improving indirect observation skills comprising, in combination, means defining a plurality of channels intersected by a main channel, exclusive thereof, through which they communicate, means for blocking at least a portion of said intersecting channel from view, whereby at least one test object, adapted to block at least one channel of said plurality, can be hidden from view in said intersecting channel and indirectly observed by guiding a projectile in each respective channel of said plurality and by determining in which channels of said plurality the movement of said projectile therethrough is affected, whereby by observing said movement a hypothesis can be formed as to the identity of the test object, the forming of said hypothesis being helpful for improving indirect observation skills; and at least one test object for use in said teaching aid, wherein said test object has a generally straight surface adapted to stop a projectile in a channel, whereby said hypothesis can be formed by determining in which channels of said plurality the projectile is stopped.

2. A teaching aid as described in claim 1, wherein said means for blocking at least a portion of said intersecting channel from view is removable, whereby said hypothesis can be tested by removing it and directly observing said object.

3. A teaching aid for improving indirect observation skills comprising, in combination, means defining a plurality of channels intersected by a main channel, exclusive thereof, through which they communicate, means for blocking at least a portion of said intersecting channel from view, whereby at least one test object, adapted to block at least one channel of said plurality, can be hidden from view in said intersecting channel and indirectly observed by guiding a projectile in each respective channel of said plurality and by determining in which channels of said plurality the movement of said projectile therethrough is affected, whereby by observing said movement a hypothesis can be formed as to the identity of the test object, the forming of said hypothesis being helpful for improving indirect observation skills; and at least one test object for use in said teaching aid, wherein said test object has a generally sloping surface adapted to guide a projectile therealong through said intersecting channel from one channel of said plurality to another, whereby said hypothesis can be formed by determining in which channels of said plurality of projectile is guided therefrom to another channel.

4. A device comprising a frame, means in said frame defining a plurality of channels extending parallel to each other in a first direction and a main channel extending generally perpendicularly to said plurality of channels in communication therewith to permit free passage of projectiles in said plurality of channels through said main channel; a plurality of different geometric objects respectively adapted to be inserted in said main channel for blocking at least one of said plurality of channels to effect passage of a projectile in said at least one of said plurality of channels in accordance with the shape of the object.

5. A teaching aid for improving indirect observation skills comprising, in combination, means defining a plurality of channels intersected by a main channel, exclusive thereof, through which they communicate, means for blocking at least a portion of said intersecting channel from view, whereby at least one test object, adapted to block at least one channel of said plurality, can be hidden from view in said intersecting channel and indirectly observed by guiding a projectile in each respective channel of said plurality and by determining in which channels of said plurality the movement of said projectile therethrough is affected, whereby by observing said movement a hypothesis can be formed as to the identity of the test object, the forming of said hypothesis being helpful for improving indirect observation skills; wherein said means defining said plurality of channels and said intersecting channel comprises a generally flat surfaced base having two spaced-apart series of guide-rails projecting upwardly therefrom, each guide rail of each series having its longitudinal axis aligned with respect to the longitudinal axis of a corresponding guide-rail of the other series and being space apart therefrom, each of the corresponding guide rails together forming an elongated guide-rail having a missing section along its length, each channel of said series being defined between adjacent ones of said elongated guide rails and said intersecting channel being defined through said missing sections thereof.

6. A teaching aid as described in claim 5, wherein said means for blocking at least a portion of said intersecting channel from view is an opaque shield mounted for easy removal above said intersecting channel.

7. A teaching aid as described in claim 6, having a stop means at the end of each channel of said series for stopping a projectile guided thereto, whereby it can be observed thereat when stopped.

8. A teaching aid as described in claim 7, and projectiles for use therewith, wherein the projectiles are spheres and wherein said base has means for maintaining it at slight angle with respect to the horizontal so that said plurality of channels slope downward in the direction of the longitudinal axis of said rails toward said stop means, whereby said spheres are guided in said channels by rolling down said slope between said rails.

9. A teaching aid and projectiles as described in claim 8, wherein at least two portions of said base, located one to each side of said intersecting channel, are transparent and said spheres are opaque, whereby said teaching aid may be used with an overhead projector to project said spheres for observation by a group when they are above said transparent portions.

10. A teaching aid as described in claim 9, wherein said aid has a top comprising two sections, each mounted respectively above a respective one of said two series of guide-rails and having at least a portion therein, above each channel, which is transparent and which is aligned with a said transparent portion of said base, whereby a sphere guided beneath said transparent section in said channel may be observed.

11. A teaching aid as described in claim 10, wherein said transparent portion has opaque indicia selectively associated therewith for identifying the respective channels of said series, said indica being opaque so that they can be projected by an overhead projector.

12. A teaching aid as described in claim 11, wherein all portions of said base and said two sections of said top are transparent, whereby a said ball may be projected by an overhead projector when it is located anywhere in said channel, except beneath said shield.

* * * * *